US010769264B2

(12) United States Patent
Gnanasekaran (10) Patent No.: US 10,769,264 B2
(45) Date of Patent: *Sep. 8, 2020

(54) SYSTEMS AND METHODS FOR AUTHENTICATION VIA BLUETOOTH DEVICE

(71) Applicant: PAYPAL, INC., San Jose, CA (US)

(72) Inventor: Venkatesh Gnanasekaran, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,027

(22) Filed: Mar. 18, 2019

(65) Prior Publication Data

US 2019/0213318 A1 Jul. 11, 2019

Related U.S. Application Data

(63) Continuation of application No. 14/313,896, filed on Jun. 24, 2014, now Pat. No. 10,235,512.

(51) Int. Cl.
| | |
|---|---|
| *G06F 21/35* | (2013.01) |
| *H04L 29/06* | (2006.01) |
| *H04W 12/06* | (2009.01) |
| *H04W 12/00* | (2009.01) |
| *H04W 84/18* | (2009.01) |

(52) U.S. Cl.
CPC .......... *G06F 21/35* (2013.01); *H04L 63/0823* (2013.01); *H04L 63/0853* (2013.01); *H04W 12/003* (2019.01); *H04W 12/06* (2013.01); *H04W 84/18* (2013.01)

(58) Field of Classification Search
CPC ..... G06F 21/35; H04L 63/0853; H04W 12/06
See application file for complete search history.

(56) References Cited

U.S. PATENT DOCUMENTS

| 8,819,445 | B2 | 8/2014 | Schrecker |
| 9,154,948 | B2 | 10/2015 | Khare |
| 9,210,133 | B2 | 12/2015 | Yau |
| 9,280,765 | B2 | 3/2016 | Hammad |
| 9,348,990 | B2 | 5/2016 | Chuaprasert |
| 9,520,918 | B2 | 12/2016 | Adrangi |
| 9,948,359 | B2 * | 4/2018 | Horton ................. H04B 5/0056 |
| 2003/0108009 | A1 | 6/2003 | Petersen |
| 2003/0159050 | A1 | 8/2003 | Gantman |

(Continued)

*Primary Examiner* — Linglan E Edwards
(74) *Attorney, Agent, or Firm* — Haynes and Boone LLP (57) ABSTRACT

A system and/or method is provided to implement authentication for a user device, without having to enter authentication credentials. Based on the presence of at least two paired short-range communication devices near the user device. In an example, a user's Bluetooth device, such as a smart phone, may be registered to be used for automatic authentication for an online user account. When the user is attempting to log onto the online user account at a user device, such as a laptop, the user device may detect that the user's Bluetooth device is in proximity to the user device and is paired to the user device and thus allow the user to be logged into the online user account at the user device automatically. Thus, the user may be logged into the online user account seamlessly without requiring the user to input credentials, such as user name and/or password.

17 Claims, 4 Drawing Sheets

(56) References Cited

U.S. PATENT DOCUMENTS

| | | | |
|---|---|---|---|
| 2005/0015601 A1* | 1/2005 | Tabi | G06F 21/6227 |
| | | | 713/182 |
| 2006/0136741 A1* | 6/2006 | Mercredi | G07C 9/257 |
| | | | 713/185 |
| 2008/0268776 A1 | 10/2008 | Amendola | |
| 2009/0187625 A1 | 7/2009 | Blackstock et al. | |
| 2011/0136442 A1* | 6/2011 | Beals | H04L 63/107 |
| | | | 455/73 |
| 2011/0215921 A1 | 9/2011 | Ben Ayed | |
| 2011/0313922 A1 | 12/2011 | Ben Ayed | |
| 2012/0036364 A1 | 2/2012 | Yoneda | |
| 2012/0322376 A1 | 12/2012 | Couse | |
| 2013/0081119 A1 | 3/2013 | Sampas | |
| 2013/0165047 A1* | 6/2013 | Suzuki | H04W 12/06 |
| | | | 455/41.2 |
| 2013/0174252 A1* | 7/2013 | Weber | G06F 21/6218 |
| | | | 726/20 |
| 2014/0123224 A1* | 5/2014 | Nosrati | H04W 12/003 |
| | | | 726/3 |
| 2014/0222574 A1 | 8/2014 | Emigh | |
| 2014/0237236 A1* | 8/2014 | Kalinichenko | G06F 21/43 |
| | | | 713/168 |
| 2014/0256304 A1* | 9/2014 | Frye | H04W 4/40 |
| | | | 455/418 |
| 2014/0317708 A1 | 10/2014 | Adrangi | |
| 2015/0020180 A1* | 1/2015 | Ngan | H04L 63/107 |
| | | | 726/7 |
| 2015/0040198 A1* | 2/2015 | Gopalakrishnan | |
| | | | H04L 63/0492 |
| | | | 726/5 |
| 2015/0188891 A1 | 7/2015 | Grange | |

\* cited by examiner

SYSTEMS AND METHODS FOR AUTHENTICATION VIA BLUETOOTH DEVICE

RELATED APPLICATIONS

This application is a continuation of U.S. patent application Ser. No. 14/313,896 filed Jun. 24, 2014, which is incorporated by reference herein in its entirety.

BACKGROUND

Technical Field

The present invention generally relates to systems and methods for authentication via one or more Bluetooth devices.

Related Art

Various online websites rely on user names and passwords to authenticate users who wishes to access the respective user accounts provided by these websites. With the increasing use of electronic commerce, a user may have a plurality of different online accounts. As such, it may become difficult for the user to remember all the different combinations of user names and passwords for these different online accounts. Moreover, it may be tedious and inconvenient for the user having to enter user names and passwords every time he or she wishes to access an online account. Thus, there is a need for a system or method provides an improved process for authenticating users.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system and/or method may be provided to implement authentication via a Bluetooth device. In particular, a user's Bluetooth device, such as a smart phone, may be used for automatic authentication for an online user account. When the user is attempting to access the online user account at a user device, such as a laptop, the user device may detect that the user's Bluetooth device is in proximity (e.g., in communication range) to the user device and the user may be logged into the online user account on the user device automatically. Thus, the user may be logged into the online user account seamlessly without requiring the user to input credentials, such as user name and/or password.

In an embodiment, the user's Bluetooth device may first be registered at an authentication server. A set of private and public keys may be generated at the Bluetooth device. The public key may be registered and stored at the authentication server. When user authentication is required at the user device, the user device may detect whether the Bluetooth device is in proximity. A session ID issued from the authentication server may be passed from the user device to the Bluetooth device and the session ID may be encrypted at the Bluetooth device using the private key. The encrypted session ID is then sent back to the authentication server via the user device. The authentication server may decrypt the encrypted session ID with the public key. If the decrypted session ID matches the session ID initially issued by the authentication server, the user is automatically logged in at the user device without requiring the user to enter user name and/or password.

In an embodiment, a combination of different Bluetooth devices may be designated for automatic authentication. As such, when the combination of the different Bluetooth devices are in proximity to or are paired with the user device, the user may automatically be authenticated at the user device. In another embodiment, different Bluetooth devices may be designated for automatic authentication at different user accounts. For example, a first Bluetooth device or a first combination of Bluetooth devices may be designated for automatic authentication for the user's personal account while a second Bluetooth device or a second combination of Bluetooth devise may be designated for automatic authentication for the user's work account.

In an embodiment, multiple users with multiple Bluetooth devices may be associated with the same account or the same user device. As such, when more than one user is in proximity to the user device, the authentication server may determine whether to log in the users automatically based on the type of user account. For example, if multiple users are associated with one shared user account, the authentication server may allow the users associated with the account to log in automatically as long as at least one of the users are in proximity. In another example, if multiple users share the same user device, e.g., personal computer, by each have a different account at the user device, the authentication server may not automatically log in any user when more than one user is in proximity and may require one of the users to log in manually, e.g., by entering user name and password, to ensure the correct user is log into the correct user account at the user device.

In an embodiment, authentication via Bluetooth may be implemented for providing automatic authentication for other applications or transactions. For example, the user may be automatically authenticated for a payment transaction or for accessing certain applications, such as a banking application on the user's device. In another example, the authentication via a Bluetooth device may be used to log the user into a computer or a mobile device, without requiring the user to enter a PIN code. In still another example, the authentication via a Bluetooth device may be used to authenticate the user for entry into vehicles, buildings, restricted areas, public/private events, and the like. In other embodiments, Near-Field Communication (NFC), such as WiFi, Radio-Frequency Identification (RFID), or the like, also may be implemented for automatic authentication.

Figure 1:
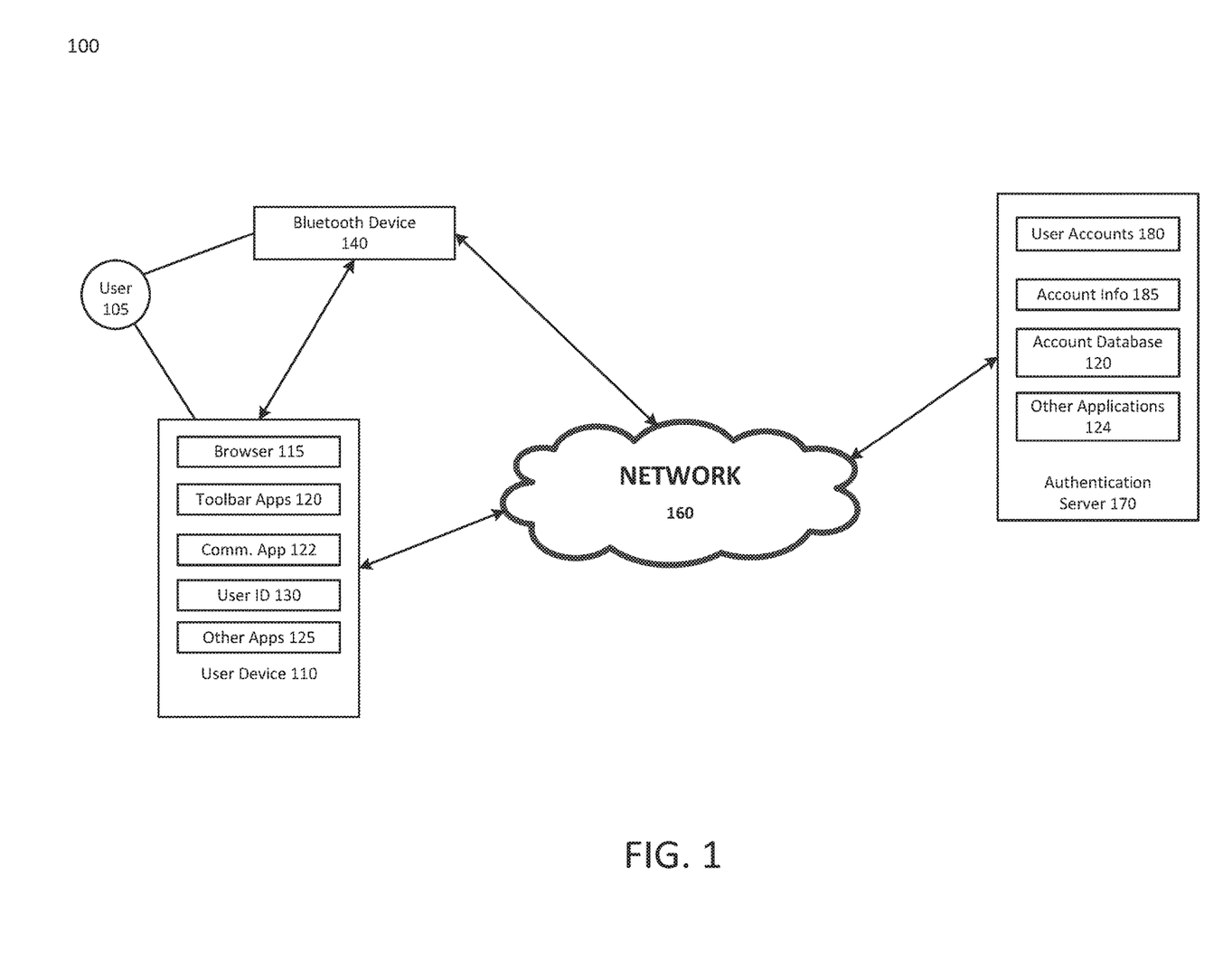
FIG. 1 is block diagram of a networked system suitable for implementing authentication via a Bluetooth device according to an embodiment.

FIG. 1 is a block diagram of a networked system 100 configured to implement a process for authentication via a Bluetooth device in accordance with an embodiment of the invention. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a Bluetooth device 140, and an authentication server 170 in communication over a network 160. Authentication server 170 may be maintained by a merchant or an Internet company that provides service, content, or products to consumers or users. A user 105, such as a consumer, may utilize user device 110 to access certain content or service offered at the authentication server 170. For example, user 105 may utilize user device 110 to visit a web site provided by the authentication server 170 to browse for contents or services offered at the application server 170. Although only one authentication server is shown, a plurality of authentication servers may be utilized.

User device 110, Bluetooth device 140, and authentication server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, wearable device, laptop computer, and/or other types of computing devices capable of transmitting and/or receiving data, such as an iPad™ or an iPhone™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, or make transactions.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used to associate user 105 with a particular account at the authentication server 170. A communications application 122, with associated interfaces, enables user device 110 to communicate within system 100. User device 110 may include applications for implementing Near Field Communication (NFC), such as Bluetooth communication. For example, user device 110 may include applications for pairing the user device 110 with one or more Bluetooth devices to implement Bluetooth communication.

Bluetooth device 140 may have one or more similar components as that of user device 110. In particular, Bluetooth device 140 may be a mobile device, such as a smart phone or a Bluetooth dongle, which may be carried by the user 105. As such, the presence of the Bluetooth device 140 may represent a presence of the user 105. The Bluetooth device 140 may include applications for implementing Bluetooth communication with other nearby devices. The Bluetooth device 140 may be associated with the user's account and registered at the authentication server 170.

Authentication server 170 may be maintained, for example, by a merchant or an online company which may provide content, services, or software products that may be viewed, utilized, or installed at consumer's computing devices. Authentication server 170 may store information related to user accounts 180. For example, various users may be registered at the authentication server 170 to utilize content or service provided by the authentication server 170. Authentication server 170 may store various account information 185 associated with each user account. The account information may include private information of users such as account numbers, passwords, device identifiers, user names, phone numbers, credit card information, bank information, or other financial information. Account information may also include usage history and user ratings. Authentication server 170 may include other applications 124 such as an authenticator configured to authenticate users. Authentication server 170 also may include a security application configured to encrypt/decrypt data information to provide secured communication and transfer of data.

Figure 2:
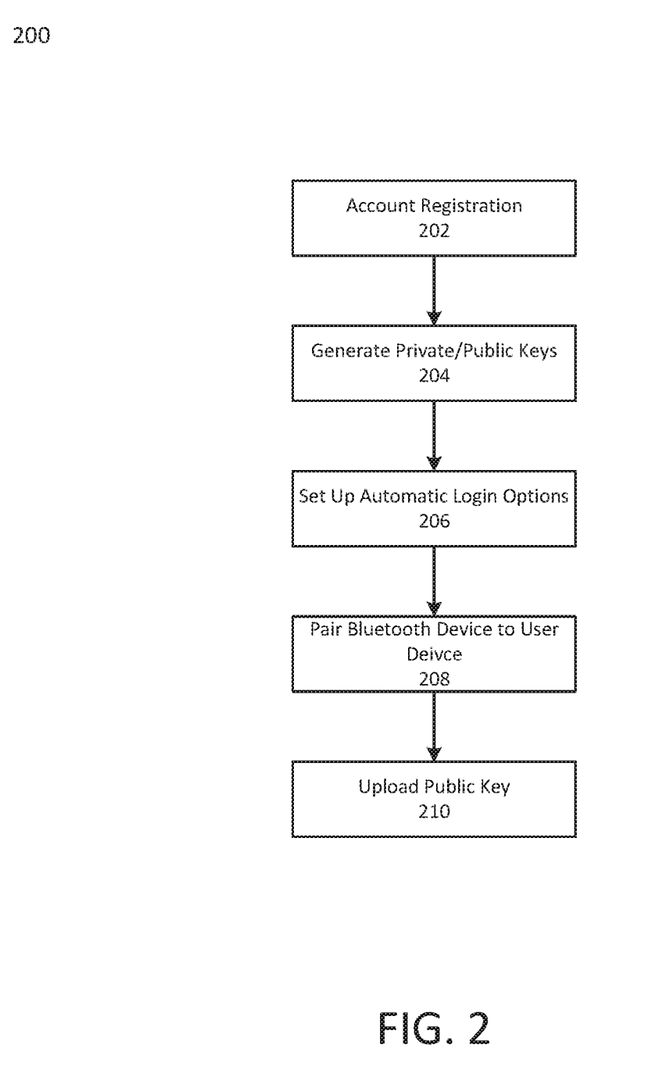
FIG. 2 is a flowchart showing a process for setting up a user account for authentication via a Bluetooth device according to one embodiment.

FIG. 2 is a flowchart showing a process for setting up a user account for authentication via Bluetooth device according to one embodiment. At step 202, a user account may be registered at the authentication server 170. For example, the user 105 may set up a user account at the authentication server 170 to receive content or services from the authentication server 170. The user 105 may first download a Bluetooth authentication application from the authentication server 170 to the Bluetooth device 140. The Bluetooth authentication application may be configured to implement authentication via Bluetooth. The application also may implement content or services from the authentication server 170. During registration, the user 105 may provide various personal information to the authentication serve 170, such as user name, password, address, contact information, account settings user preferences, and the like. The user 105 also may indicate whether the user wishes to utilize authentication via Bluetooth in user preferences.

At step 204, the Bluetooth device 140 may generate a unique set of public and private keys for encryption. The encryption may facilitate secured communication to and from the Bluetooth device 140. The public/private key set may be a type of asymmetric cryptography. The private key and the public key may be associated mathematically. The private key may be used to encrypt data for secured data communication. The public key may be given to other devices that receive the encrypted data to decrypt the encrypted data. In an embodiment, the private/public key set may be generated at the Bluetooth device 140, such that the private key is kept at the Bluetooth device 140 and the public key is forwarded to the authentication server 170. In another embodiment, the private/public key set may be generated at the authentication server 170, such that the private key is kept at the authentication server 170 and the public key is forwarded to the Bluetooth device 140. In an embodiment, a unique set of private/public keys may be generated for each account or device on which the user 105 is to be authenticated.

At step 206, the user 105 may first log into the user account at the authentication server 170 to set up the automatic login options. The user 105 may selectively turn on or off the automatic login option. The user 105 also may designate one or more Bluetooth devices that may trigger the automatic login. Further, the user 105 may designate devices, websites, accounts, or other settings for using automatic login via Bluetooth. For example, the user 105 may designate an account at the authentication server 170 that is to be automatically logged in using the Bluetooth device 140. The Bluetooth device 140 or the device ID of the Bluetooth device 140 may be associated with this account. Thus, the authentication server 170 may determine which account is to be logged in automatically when the Bluetooth device 140 is in proximity.

In some embodiments, multiple Bluetooth devices may be associated with one account for automatic authentication. For example, when any one of the designated Bluetooth devices is present, the account may automatically be logged in. In another example, the account may automatically be logged in when all of the designated Bluetooth devices are present. In still another example, the account may automatically be logged in when only one of the designated Bluetooth devices is present. In an embodiment, a certain combination of Bluetooth devices in proximity may trigger automatic login for a certain account. For example, when the user 105's smart phone and smart watch are present, a personal email account may automatically be logged in at the user device 110. In another example, when the user 105's smart phone and work laptop are present, a work email account may automatically be logged in. Thus, the user may set up different combinations of Bluetooth devices for automatic login of different accounts or devices.

At step 208, the Bluetooth device 140 may be paired with the user device 110 via Bluetooth communication. In an embodiment, the Bluetooth device 140 may subsequently be automatically paired with the user device 110 when the Bluetooth device 140 is in proximity to the user device 110. At step 210, the public key generated for the account or the device may be forwarded from the Bluetooth device 140 to the authentication server 170. The authentication server 170 may store and associate the public key with the Bluetooth device that generated the public key.

By the process 200, automatic authentication may be set up for an account at the authentication server 170. In particular, a unique set of private/public keys may be generated for secured communication for authenticating the user 105. The user 105 also is allowed to designate one or more Bluetooth devices that may trigger the automatic authentication of the account. Further, the user is allowed to set how the automatic authentication is triggered.

Figure 3:
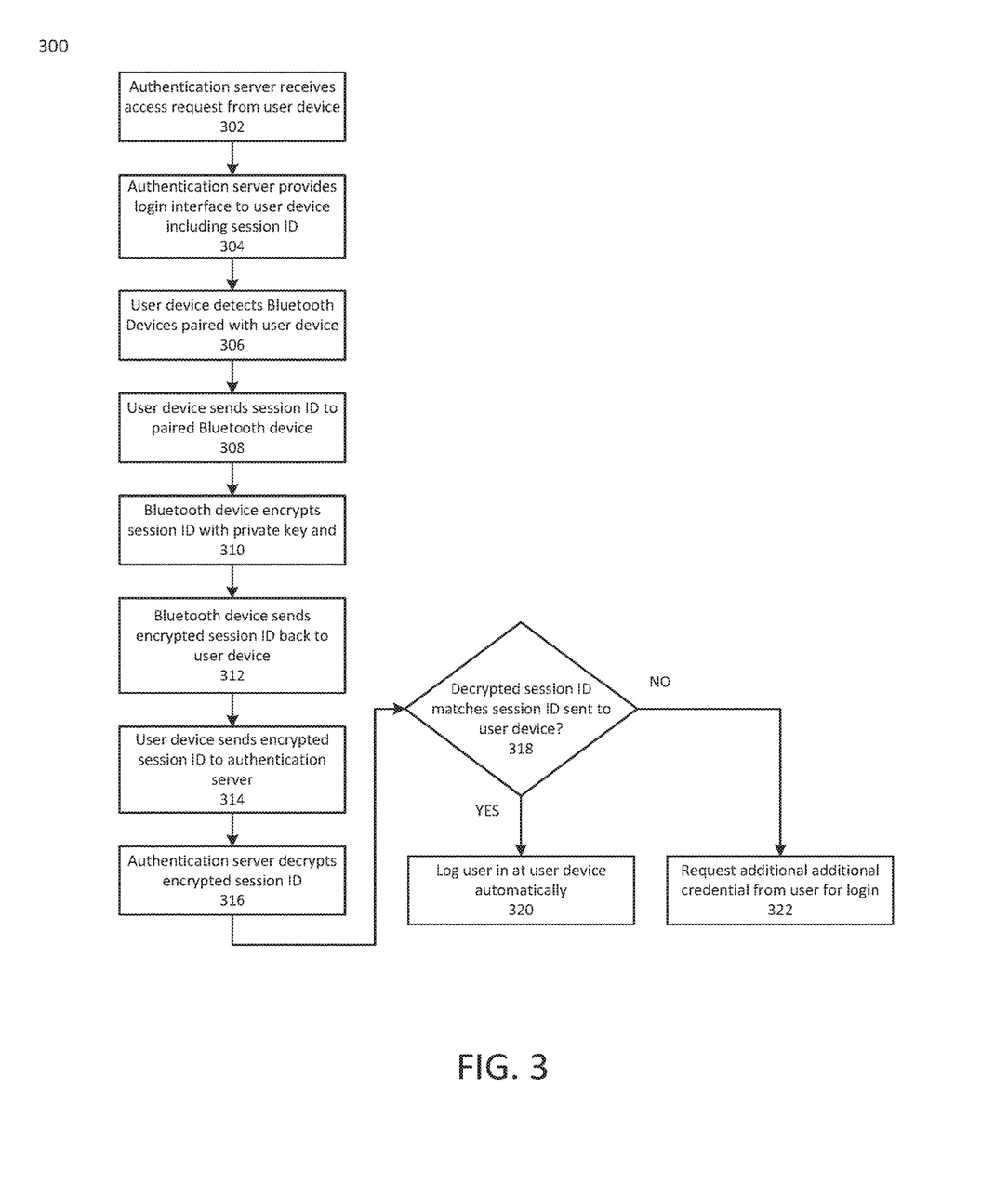
FIG. 3 is a flowchart showing a process for authentication via a Bluetooth device according to one embodiment.

FIG. 3 is a flowchart showing a process for authentication via Bluetooth device according to one embodiment. At step 302, the authentication server 170 may receive a request to access an account at the authentication server 170. For example, the user 105 may use a browser at the user device 110 to visit a web site that allows the user 105 to log into the user 105's account at the authentication server 170. At step 304, the authentication server 170 may provide an interface for the user 105 to log in. For example, the authentication server 170 may send a webpage to the user device 110 that includes fields for the user 105 to enter credentials, such as user name and/or password, for authentication.

The authentication server 170 may generate a session ID which is forwarded to the user at the user device 110 along with the login interface. The session ID may be unique to the login session and may identify the particular session the user is about to log in. A new session ID may be generated and used for each time the user 105 accesses the user's account. As such, the authentication server 170 may be able to keep track of the different sessions of account accesses. The session ID may have an expiration time, such as 5 minutes or 10 minutes. When the session ID has expired, the account access may end and the user 105 may automatically be logged out of the account. In an embodiment, the authentication server 170 may keep the session ID alive when the user 105 continues to access the account, e.g., continuing user activities in the account. As such, the session ID may expire or the account access may time out when the user 105 is inactive for a predetermined amount of time.

At step 306, the user device 110 may detect or determine Bluetooth devices paired with the user device 110. In an embodiment, the authentication interface sent from the authentication server 170 may include instructions for the user device 110 to search for Bluetooth devices configured for automatic authentication. For example, the login webpage may include programming code, such as Javascript, that triggers the user device 110 to search for the Bluetooth device 140. In particular, the user device 110 may be paired with one or more Bluetooth devices. The user device 110 may search for a paired Bluetooth device that has a Bluetooth service ID designated for authentication. For example, the Bluetooth device 140 may be paired with the user device 110 having a Bluetooth service ID designated for automatic authentication while other Bluetooth devices paired with the user device 110 may have other service IDs for other functions, such as audio output, mouse input, and the like. As such, the user device 110 may determine whether any Bluetooth devices with the authentication service ID is currently paired with the user device 110.

At step 308, if there is one or more Bluetooth devices with the authentication service ID paired with the user device 110, the user device 110 may forward the session ID issued from the authentication server 170 to the Bluetooth device 140, which is paired with the user device for the purpose of automatic authentication. In some embodiments, more than one Bluetooth devices may be paired with the user device 110 for automatic authentication. In this case, the user device 110 may send the session ID to each of the paired Bluetooth devices that are designated for automatic authentication. At step 310, the Bluetooth device 140 may receive the session ID and may encrypt the session ID with the private key previously created for automatic authentication. In some embodiments, multiple Bluetooth devices may receive the session ID. In this case, each of the multiple Bluetooth devices may encrypt the session ID with each of the Bluetooth devices' own unique private key.

At step 312, the Bluetooth device 140 or the multiple Bluetooth devices may send the encrypted session ID back to the user device 110. In an embodiment, the encrypted session ID may be included with a Bluetooth device ID of the Bluetooth device that encrypted the session ID. As such, in the case that the session ID is encrypted by multiple Bluetooth devices, it may be determined which encrypted session ID is encrypted by which Bluetooth device. At step 314, the user device 110 may send the encrypted session ID to the authentication server 170.

At step 316, the authentication server 170 may receive the encrypted session ID from the user device 110 and may decrypt the encrypted session ID. In particular, the authentication server 170 may determine the public key for decrypting the session ID based on the device ID of the user device 110 or the device ID of the Bluetooth device included with the encrypted session ID. For example, based on the device ID of the user device 110, the authentication server 170 may determine the user account that is associated with the user device 110. The user account may indicate one or more Bluetooth devices and their respective public keys for decrypting the encrypted session ID. In an embodiment, the device ID of the Bluetooth device may be used to find the public key associated with the Bluetooth device that encrypted the session ID. After identifying the public key, the authentication server 170 may decrypt the encrypted session ID using the identified public key.

At step 318, the authentication server 170 may match the decrypted session ID with the session ID, which was originally issued from the authentication server 170. If the decrypted session ID matches the originally issued session ID, the authentication server 170 may automatically authenticate or log in the user 105 at the user device 110 at step 320. As such, the user 105 may access the user account without having to enter credentials, such as user name and/or password. On the other hand, if the decrypted session ID does not match the originally issued session ID or if no encrypted session ID is received from the user device 110, the authentication server 170 may require the user to enter credentials at the user device 110 to gain access to the user account at step 322.

In some embodiments, the user 105 may set up various requirements for automatic authentication. For example, automatic authentication may require the presence of a specific combination of Bluetooth devices. The user 105 may be automatically authenticated at the user device 110 when the user 105's smart phone and the user 105's smart watch are both in proximity and paired with the user device 110. In this case, the session ID issued from the authentication server 170 may be encrypted by both the user 105's smart phone and smart watch using their respective private keys. The authentication server 170 may receive two encrypted session IDs, one encrypted by the smart phone and one encrypted by the smart watch. The authentication server 170 may decrypt these two encrypted session IDs respectively using the smart phone's public key and the smart watch's public key. When both of the decrypted session ID's match the originally issued session ID, the authentication server 170 may allow automatic authentication at the user device 110.

In an embodiment, different combination of Bluetooth devices may trigger automatic authentication for different user accounts. For example, when the user's smart watch and smart phone are present at the user device 110, the authentication server 170 may automatically log the user 105 into the user 105's personal email account. When the user's work phone and smart watch are present at the user device 110, the authentication server 170 may automatically log the user 105 into the user 105's work email account. As such, the user 105 may designate different combinations of Bluetooth devices for automatic authentication of different accounts.

In an embodiment, based on the type of account, the authentication server 170 may determine whether to implement automatic authentication when more than one Bluetooth devices are present at the user device 110. For example, an account may be shared by multiple users. When one or more of the Bluetooth devices associated with the multiple users of the shared account are present at the user device 110, the authentication server 170 may implement automatic authentication regardless of which of the multiple users is present. In another example, a computer may be shared by multiple users each with his/her own unique user account. As such, when multiple users are detected at the computer, the authentication server 170 may not implement automatic authentication, such that an account is not accessed by a wrong user.

In an embodiment, the Bluetooth signal strength from different Bluetooth devices may be used to determine which Bluetooth device or which user is located closest to the user device 110. As such, the correct user account may be determined for the correct user based on how close the users are to the user device 110. For example, the account of the user located closest to the user device 110 may automatically be authenticated assuming the user located closest to the user device 110 is at the user device 110 attempting to access the user account.

In an embodiment, the user 105 may be allowed to set a distance range within which the automatic authentication is to be implemented. For example, the user 105 may want to be automatically authenticated only when the user 105 is located directly at the user device 110. As such, the automatic authentication may be implemented when the Bluetooth signals received from the user 105's Bluetooth device 140 is very strong. When the Bluetooth signals received from the user 105's Bluetooth device 140 is weak, the user 105 may not be automatically authenticated. This may ensure that the user 105's account is not accessed by others when the user 105 is not directly located at the user device 110. In an embodiment, certain locations may be designated for automatic login, such as the user's home or the user's work place. For example, the user device 110 or the Bluetooth device 140 may include a Global Positioning System (GPS) device or other location sensor. When the user device 110 or the Bluetooth device 140 is within a designated location, based on the location detected by the GPS device, the user device 110 or the Bluetooth device 140 may implement automatic login. As such, the user 105 may designate certain familiar locations where the user 105 may be automatically log into an account or a device.

The above processes 200 and 300 for automatic authentication via Bluetooth devices may allow the user 105 to quickly and conveniently log in or gain access to an account at the user device 110 when one or more of the user 105's Bluetooth devices are in proximity to and paired with the user device 110. Thus, the user 105 may be automatically log into the user's account without having to enter credentials, such as user name and/or password. In particular, the automatic authentication process may utilize the encryption and decryption of a session ID between the Bluetooth device 140 and the authentication server 170 to authenticate the user 105 automatically.

The automatic authentication via Bluetooth process may be implemented for access to other applications or devices besides user accounts at the user device 110. In an embodiment, the process may be implemented for automatically logging the user into a device, such as a computer. For example, a computer, such as a laptop, a desktop, a mobile device, or the like may require a user name and/or a password or a PIN to gain access to the device. The user 105 may register the device at the authentication server 170 to use automatic authentication via a Bluetooth device. The user 105 may designate one or more Bluetooth devices, the presence of which may trigger automatic authentication for access to the device. When the designated Bluetooth device is in proximity and be paired with the device, the authentication server 170 may automatically authenticate and allow the user to access the device without entering credentials, such as password and/or user name. As such, various devices, such as smart phones, wearable devices, various computing devices, and the like, may be unlocked using the automatic authentication via Bluetooth.

In an embodiment, the authentication via a Bluetooth process may be implemented for unlocking a vehicle. For example, a vehicle, such as a car, a boat, a bike, or any transportation vehicle, may require a key to gain access or start the vehicle. The user 105 may register the vehicle at the authentication server 170 to use automatic authentication via a Bluetooth device. The user 105 may designate one or more Bluetooth devices, the presence of which may trigger automatic authentication for access to the vehicle. The vehicle may include a communication device configured to communicate and be paired with the Bluetooth device. The communication device of the vehicle also may communicate with the authentication server 170 via the network 160. When the designated Bluetooth device is in proximity and paired with the vehicle, the authentication server 170 may automatically authenticate and allow the user to access or start the vehicle without requiring a key. As such, various vehicles may be unlocked or accessed using the automatic authentication via Bluetooth.

In an embodiment, the authentication via Bluetooth process may be implemented for gaining entry into a building or unlocking a door or a gate. For example, an access point, such as a door to a house, a door to an office building, a gate to an area, or other physical access point may require a user to provide a key or certain credentials, such as passcode, to gain access or unlock. The user 105 may register the access point at the authentication server 170 to use automatic authentication via a Bluetooth device. The user 105 may designate one or more Bluetooth devices the presence of which may trigger automatic authentication for access through the access point. The access point may be equipped with a communication device configured to communicate and be paired with the Bluetooth device. The communication device of the access point also may communicate with the authentication server 170 via the network 160. When the designated Bluetooth device is in proximity and paired with the device, the authentication server 170 automatically authenticate and allow the user to access the access point without keys or credentials, such as password and/or user name. As such, various access points, such as doors or gates, may be unlocked using the automatic authentication via Bluetooth.

Figure 4:
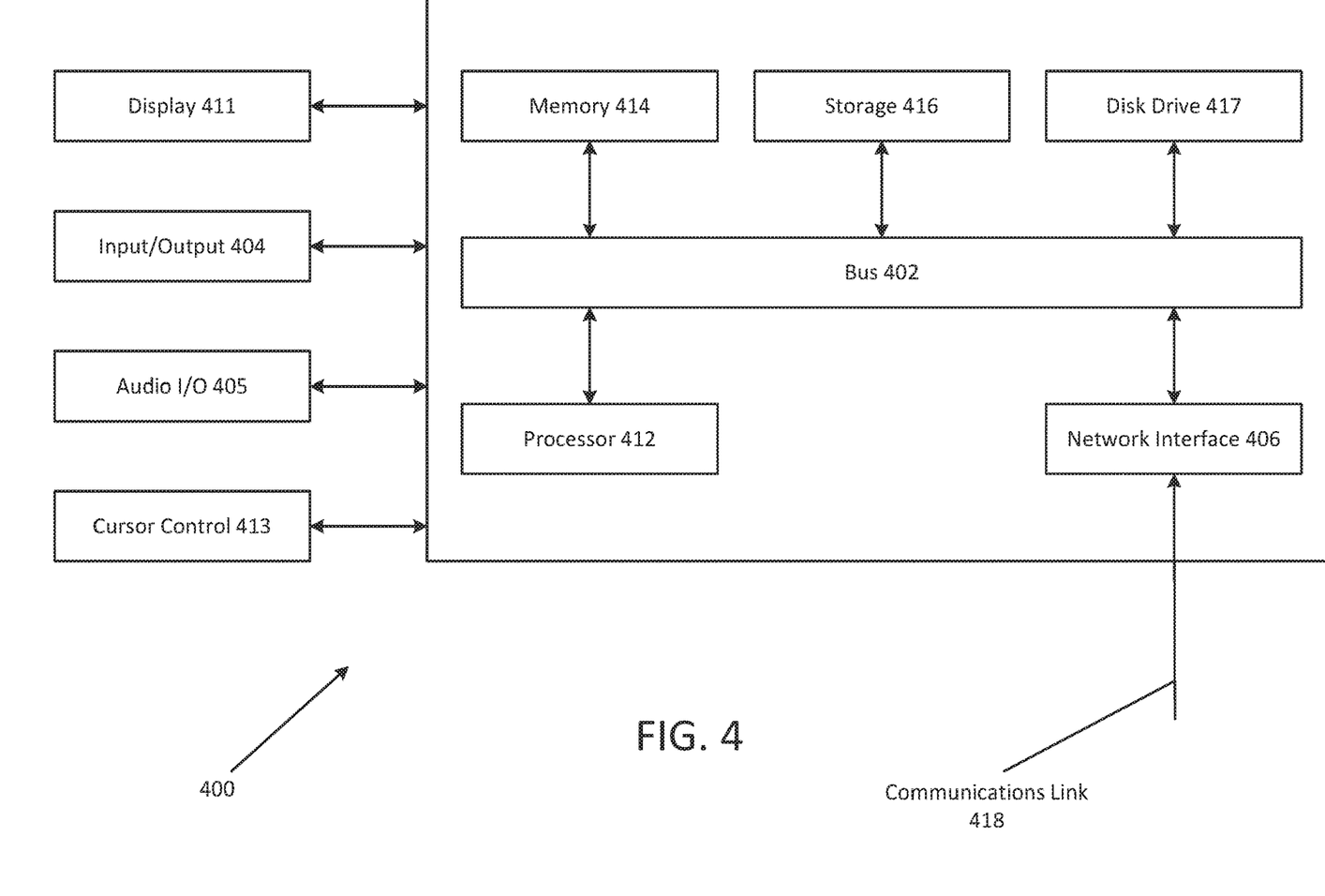
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to execute instructions to cause the system to perform operations comprising:
receiving an authentication request;
sending, in response to receiving the authentication request, a session identifier to a user device;
obtaining a first decrypted session identifier associated with a first communication device and a second decrypted session identifier associated with a second communication device;
determining that the session identifier corresponds to each of the first decrypted session identifier and the second decrypted session identifier;
determining that the first communication device is within a defined proximity of the user device and is paired with the user device based, at least in part, on the first decrypted session identifier corresponding to the session identifier;
determining that the second communication device is within the defined proximity of the user device and is paired with the user device based, at least in part, on the second decrypted session identifier corresponding to the session identifier; and
in response to the determining that both the first and second communication devices are within the defined proximity of the user device and paired with the user device, authenticating access to an account of a user automatically without entry of credentials of the account by the user or by either of the first or second communication device.

2. The system of claim 1, wherein determining that the first communication device is within the defined proximity of the user device and is paired with the user device comprises receiving, from the user device, a device identifier associated with the first communication device.

3. The system of claim 2, wherein determining that the first communication device is within the defined proximity of the user device and is paired with the user device further comprises receiving, from the user device, an encrypted session identifier corresponding to the session identifier encrypted by the first communication device using a private key of the first communication device.

4. The system of claim 3, wherein the operations further comprise decrypting the encrypted session identifier using a public key associated with the device identifier.

5. The system of claim 1, wherein the session identifier is unique to an access session based on the authentication request.

6. The system of claim 1, wherein the operations further comprise selecting the account from a plurality of accounts based on an identity of the first and second communication devices.

7. The system of claim 1, wherein:
the user device is a vehicle, a computing device, or a locking device; and
the operations further comprise sending a command to unlock the user device.

8. The system of claim 1, wherein the first communication device includes a Bluetooth device.

9. A method comprising:
receiving an authentication request;
sending, in response to receiving the authentication request, a session identifier to a user device;
obtaining a first decrypted session identifier associated with a first communication device and a second decrypted session identifier associated with a second communication device;
determining, by a processor, that the session identifier corresponds to each of the first decrypted session identifier and the second decrypted session identifier;
in response to determining that the session identifier corresponds to the first decrypted session identifier and the second decrypted session identifier, determining, by the processor, that both the first communication device and the second communication device are within a defined proximity of a user device and are paired with the user device; and
in response to the determining that both the first and second communication devices are within the defined proximity of the user device and paired with the user device, automatically authenticating, by the processor, access to the user device.

10. The method of claim 9, wherein determining that the first communication device is within the defined proximity of the user device and is paired with the user device comprises:
- receiving, from the user device, a device identifier associated with the first communication device;
- receiving, from the user device, an encrypted session identifier corresponding to the session identifier encrypted by the first communication device using a private key of the first communication device; and
- decrypting the encrypted session identifier using a public key associated with the device identifier.

11. The method of claim 9, wherein the session identifier is unique to an access session based on the authentication request.

12. The method of claim 9, further comprising:
- selecting an account from a plurality of accounts based on an identity of the first and second communication devices; and
- automatically authenticating access to the account.

13. The method of claim 9, wherein:
- the user device is a vehicle, a computing device, or a locking device; and
- the method further comprises sending a command to unlock the user device.

14. A non-transitory machine-readable medium having stored thereon machine-readable instructions executable to cause a machine to perform operations comprising:
- receiving an authentication request;
- sending, in response to receiving the authentication request, a session identifier to a user device;
- obtaining a first decrypted session identifier associated with a first authentication device and a second decrypted session identifier associated with a second authentication device;
- determining, by a processor, that the session identifier corresponds to each of the first decrypted session identifier and the second decrypted session identifier;
- in response to determining that the session identifier corresponds to the first decrypted session identifier and the second decrypted session identifier, determining that both the first authentication device and the second authentication device are within a defined proximity of a user device and are paired with the user device; and
- in response to the determining that both the first and second authentication devices are within the defined proximity of the user device and paired with the user device, authenticating access to an account of a user automatically without entry of credentials of the account by the user or by either of the first or second authentication device.

15. The non-transitory machine-readable medium of claim 14, wherein determining that the first authentication device is within the defined proximity of the user device and is paired with the user device comprises:
- receiving, from the user device, a device identifier associated with the first authentication device;
- receiving, from the user device, an encrypted session identifier corresponding to the session identifier encrypted by the first authentication device using a private key of the first authentication device; and
- decrypting the encrypted session identifier using a public key associated with the device identifier.

16. The non-transitory machine-readable medium of claim 14, wherein the first and second authentication devices are selected from a plurality of authentication devices based on a respective signal strength between the user device and at least one of the first or second authentication device.

17. The non-transitory machine-readable medium of claim 14, wherein the operations further comprise selecting the account from a plurality of accounts based on an identity of the first and second authentication devices.

* * * * *